(12) United States Patent
Kitahara et al.

(10) Patent No.: US 9,263,001 B2
(45) Date of Patent: Feb. 16, 2016

(54) DISPLAY CONTROL DEVICE

(71) Applicant: Panasonic Corporation, Osaka (JP)

(72) Inventors: Suguru Kitahara, Osaka (JP); Osafumi Moriya, Osaka (JP); Kazumasa Tabata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 95 days.

(21) Appl. No.: 14/202,138

(22) Filed: Mar. 10, 2014

(65) Prior Publication Data

US 2014/0184642 A1 Jul. 3, 2014

Related U.S. Application Data

(63) Continuation of application No. PCT/JP2013/003709, filed on Jun. 13, 2013.

(30) Foreign Application Priority Data

Jul. 10, 2012 (JP) .................. 2012-154262

(51) Int. Cl.
*G09G 5/00* (2006.01)
*G09G 5/377* (2006.01)
*G09G 5/14* (2006.01)
(Continued)

(52) U.S. Cl.
CPC .................. *G09G 5/377* (2013.01); *G09G 5/14* (2013.01); *H04N 7/142* (2013.01); *H04N 7/147* (2013.01); *H04N 21/4223* (2013.01); *H04N 21/4316* (2013.01); *H04N 21/43635* (2013.01); *H04N 21/4854* (2013.01); *H04N 21/4856* (2013.01); *G09G 2340/0442* (2013.01); *G09G 2370/12* (2013.01)

(58) Field of Classification Search
None
See application file for complete search history.

(56) References Cited

U.S. PATENT DOCUMENTS 5,742,329 A 4/1998 Masunaga et al.
6,665,006 B1 12/2003 Taguchi
(Continued)

FOREIGN PATENT DOCUMENTS

EP 0 644 694 A1 3/1995
JP 02-171094 A 7/1990
(Continued)

OTHER PUBLICATIONS

International Preliminary Report on Patentability for corresponding International Application No. PCT/JP2013/003709 mailed Jan. 13, 2015.
(Continued)

*Primary Examiner* — Yingchun He
(74) *Attorney, Agent, or Firm* — Renner, Otto, Boisselle & Sklar, LLP

(57) ABSTRACT

A display control device of the present disclosure is a device for controlling a video image displayed on a display unit. The display control device includes a controller configured to generate an image including a first image and a second image superimposed on the first image to display the image on the display unit. The controller performs control to display the first image of a first field angle on the display unit when a first mode is set, and performs control to display the first image of a second field angle which is wider than the first field angle on the display unit when a second mode is set. The second mode is a mode for setting a region of the second image in a region of the first image of the second field angle.

6 Claims, 13 Drawing Sheets

CONTROL TARGET : PinP SCREEN
PinP DISPLAY : ON
TRANSFER READING POSITION OF PinP

(51) Int. Cl.
  *H04N 7/14* (2006.01)
  *H04N 21/4223* (2011.01)
  *H04N 21/431* (2011.01)
  *H04N 21/4363* (2011.01)
  *H04N 21/485* (2011.01)

(56) References Cited

U.S. PATENT DOCUMENTS

2006/0274170 A1 12/2006 Azuma
2009/0245600 A1* 10/2009 Hoffman et al. ............ 382/128
2010/0188579 A1* 7/2010 Friedman ..................... 348/565

FOREIGN PATENT DOCUMENTS

| | | |
|---|---|---|
| JP | 06-141312 A | 5/1994 |
| JP | 07-203274 A | 8/1995 |
| JP | 07-231442 A | 8/1995 |
| JP | 09-163260 A | 6/1997 |
| JP | 2006-345055 A | 12/2006 |
| JP | 2010-119011 A | 5/2010 |
| JP | 2011-071668 A | 4/2011 |

OTHER PUBLICATIONS

International Search Report for corresponding International Application No. PCT/JP2013/003709 mailed Sep. 10, 2013.

* cited by examiner

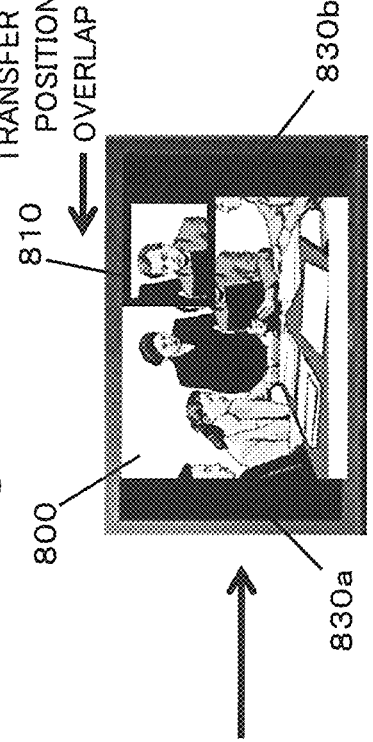

DISPLAY CONTROL DEVICE

BACKGROUND

1. Technical Field

The present disclosure relates to a display control device having a PinP (Picture in Picture) function.

2. Related Art

A display control device that has a PinP (Picture in Picture) function for displaying one image on another image is known. For example, JP 09-163260 A discloses a television receiver for displaying an image of one broadcast program and an image of another broadcast program simultaneously broadcasted from different telecast stations on one screen. In JP 09-163260 A, an image of one broadcast program is a master image, and an image of the other broadcast program is a slave image so that PinP display is performed.

SUMMARY

The present disclosure provides a display control device that can perform more preferable PinP display.

A display control device of the present disclosure is a device for controlling a video image displayed on a display unit. The display control device includes a controller configured to generate an image including a first image and a second image superimposed on the first image to display the image on the display unit. The controller performs control to display the first image of a first field angle on the display unit when a first mode is set, and performs control to display the first image of a second field angle which is wider than the first field angle on the display unit when a second mode is set. The second mode is a mode for setting a region of the second image in a region of the first image of the second field angle.

The display control device of the present disclosure enables more preferable PinP display.

BRIEF DESCRIPTION OF DRAWINGS

FIGS. 13A and 13B are diagrams describing screen transition at a time when the output aspect ratio is switched.

DETAILED DESCRIPTION OF PREFERRED EMBODIMENTS

Figure 1:
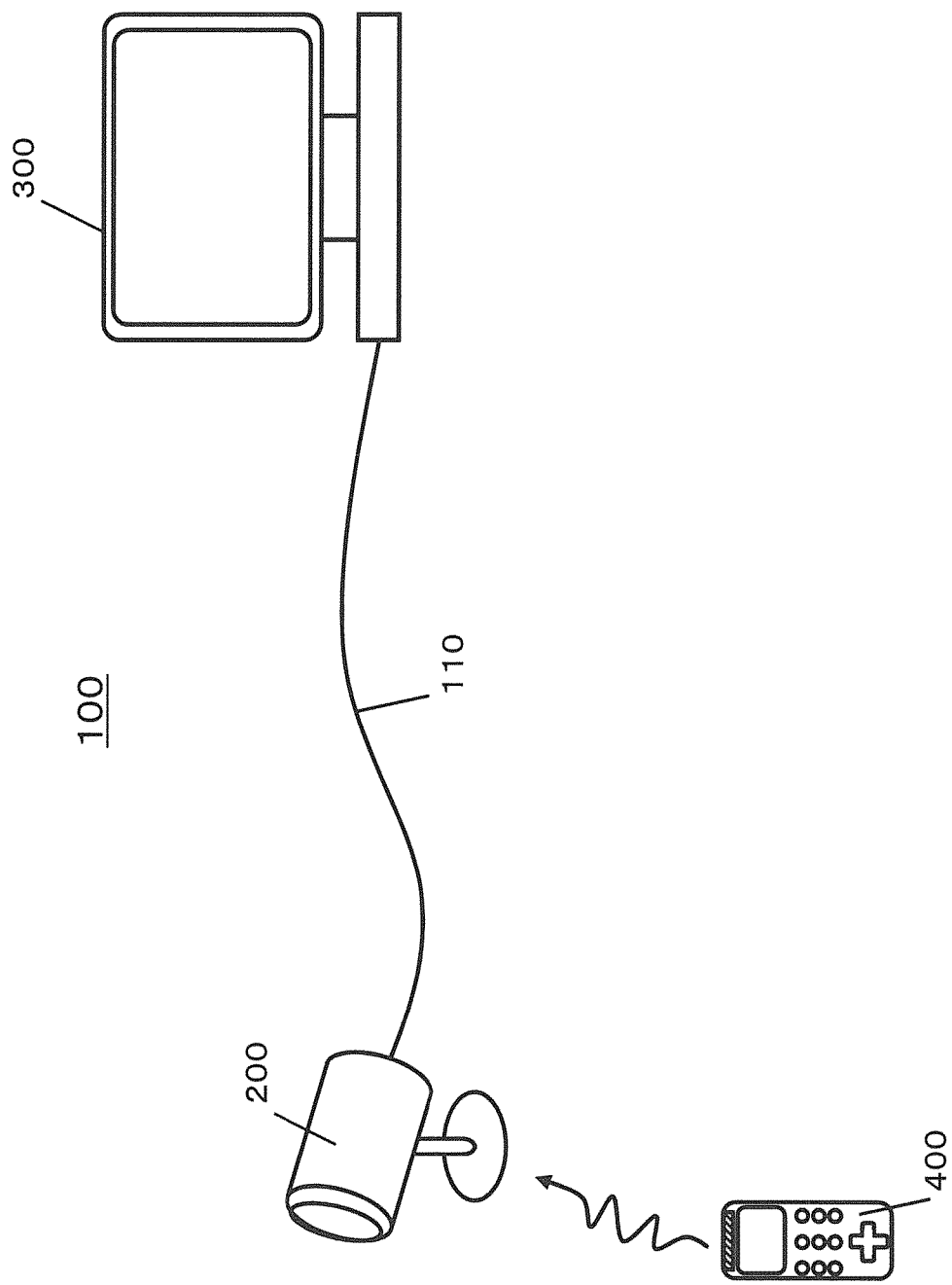
FIG. 1 is a configuration diagram of a video teleconference system according to the present embodiment.

Embodiments will be described in detail below by referring to the drawings as necessary. Note, however, that an unnecessarily detailed description may be omitted. For example, a detailed description of already well-known matters or an overlapping description of substantially the same configuration may be omitted. This is to avoid the following description from unnecessarily becoming redundant and facilitate understanding by those skilled in the art. Note that the inventor provides the accompanying drawings and the following description in order for those skilled in the art to thoroughly understand the present disclosure, and thus, it is not intended that the subject matter described in the claims is limited thereby.

First Embodiment

FIG. 1 is a configuration diagram of a video teleconference system according to a first embodiment. As shown in FIG. 1, a video teleconference system 100 according to the first embodiment includes a remote camera 200, and a display device 300 connected with the remote camera 200 via an HDMI cable 110.

Figure 2:
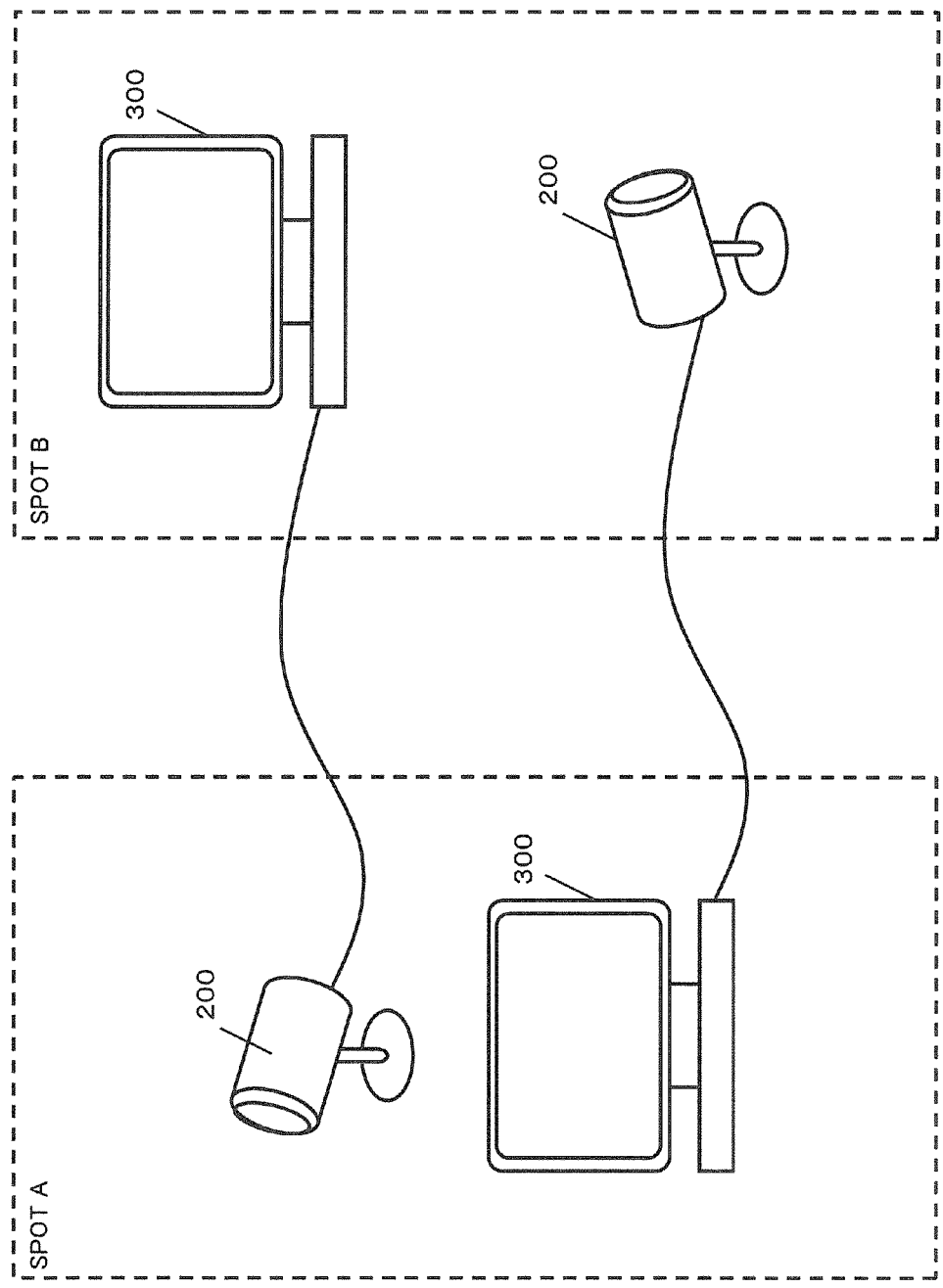
FIG. 2 is a diagram illustrating a use form of the video teleconference system in which two spots are connected with each other.

FIG. 2 is a diagram illustrating a configuration at a time when two spots A and B are connected with each other in the video teleconference system 100 according to the first embodiment. The remote camera 200 and the display device 300 may be connected with each other via a network between the two spots A and B.

Figure 3:
FIG. 3 is a diagram describing a PinP display function for displaying a PinP image on a main image.

In the video teleconference system 100, an operation of an infrared remote controller 400 on the remote camera 200 or an operation of the display device 300 can control display of a PinP image to be displayed on the display device 300. Herein, the PinP image refers another image 810 to be displayed on a main image 800 as shown in FIG. 3. The video teleconference system 100 according to the present embodiment has a PinP display function for displaying such a PinP image as well as the main image 800 on the display device 300.

A configuration and an operation of the video teleconference system 100 are sequentially described below.

1-1. Configuration 1-1-1. Remote Camera

Figure 4:
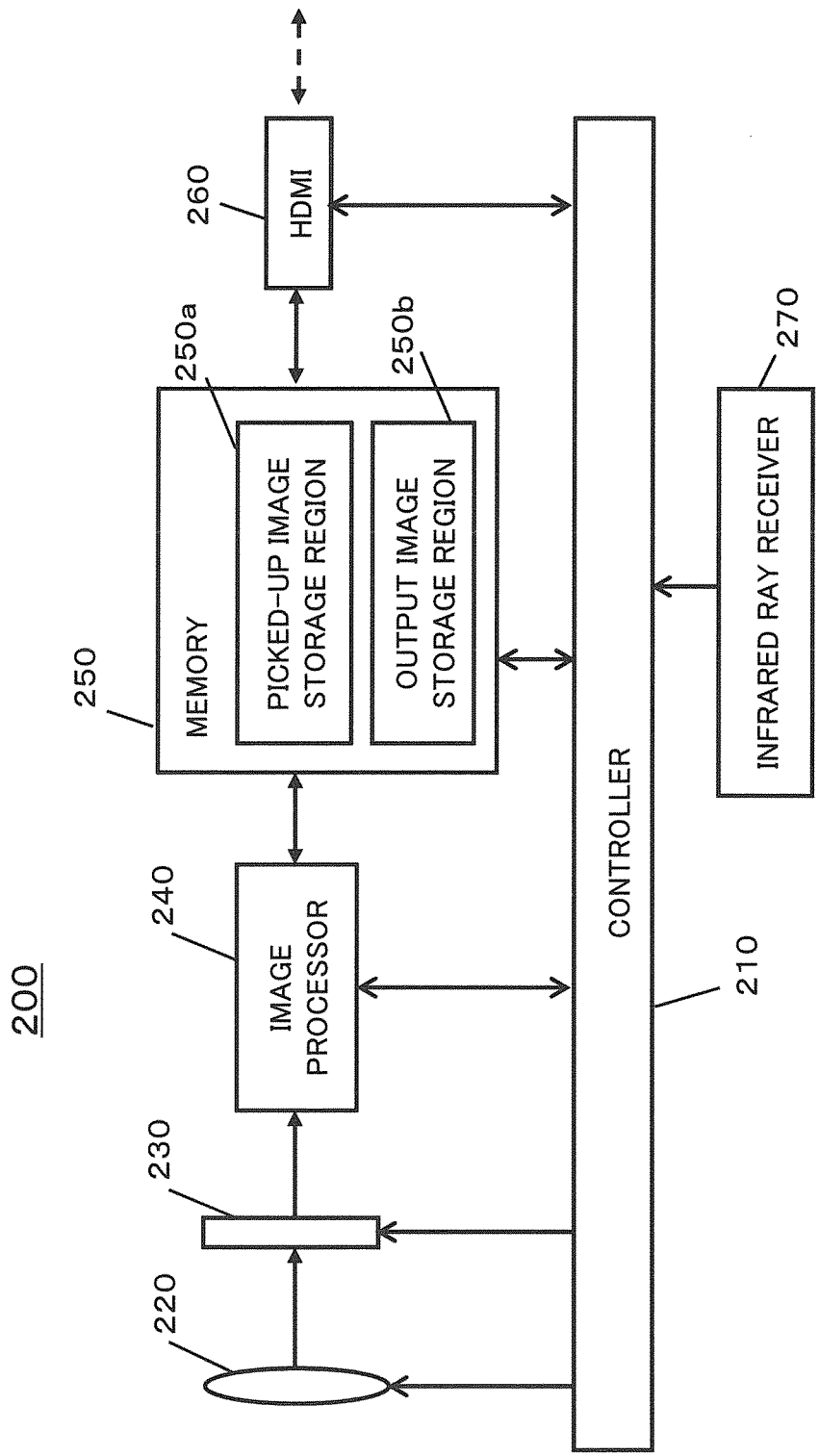
FIG. 4 is an electrical configuration diagram of a remote camera.

FIG. 4 is an electrical configuration diagram of the remote camera 200. The configuration of the remote camera 200 is described with reference to FIG. 4.

As shown in FIG. 4, the remote camera 200 includes a controller 210, a lens 220, a CMOS image sensor 230, an image processor 240, a memory 250, an HDMI interface 260, and an infrared ray receiver 270.

The controller 210 generally controls an entire operation of the remote camera 200. The controller 210 includes a ROM (not shown) for storing information such as programs, and a CPU (not shown) for processing the information such as programs. The ROM stores programs relating to lens control and digital zoom control, and programs for generally controlling the entire operation of the remote camera 200. The controller 210 transmits a control signal to the CMOS image sensor 230, the image processor 240, and the like based on a vertical synchronizing signal (VD). The controller 210 may be implemented by a hard-wired electronic circuit, a microcomputer, or the like. Further, the controller 210 as well as the image processor 240 described later, may be implemented as one integrated circuit. Note that the ROM does not have to be an internal component of the controller 210, and may be provided to the outside of the controller 210.

The lens 220 includes an optical system such as a focus lens. The remote camera 200 may include a zoom lens, a diaphragm, a mechanical shutter, and an optical hand shake correcting lens, which are not shown in FIG. 4. Various lenses included in the lens 220 may be implemented by any number of lenses or any number of lens groups.

The CMOS image sensor 230 captures a subject image formed through the lens 220 to generate image data. The CMOS image sensor 230 generates image data of a new frame at a predetermined frame rate (for example, 30 frames/sec). Image data generating timing and an electronic shutter operation of the CMOS image sensor 230 are controlled by the controller 210. Instead of the CMOS image sensor 230, another image pickup device, such as a CCD image sensor or an NMOS image sensor, may be used.

The image processor 240 executes various image processes on image data output from the CMOS image sensor 230. Examples of the various processes are gamma correction, white balance correction, a YC converting process, an electronic zooming process, a compressing process, and an expanding process, but the various processes are not limited to them. The image processor 240 may be implemented by a hard-wired electronic circuit, a microcomputer for executing programs for executing these processes, or the like. Further, the image processor 240 as well as the controller 210 and the like may be implemented as one integrated circuit.

The memory 250 is a recording medium that functions as a work memory of the controller 210 and the image processor 240. The memory 250 can be implemented by a DRAM (Dynamic Random Access Memory). The memory 250 has a picked-up image storage region 250a, and an output image storage region 250b. The picked-up image storage region 250a is a storage region for temporarily storing an image captured by the CMOS image sensor 230. The output image storage region 250b is a storage region for temporarily storing an image to be output to the display device 300. Note that, in this example, a partial region of the image picked up by the CMOS image sensor 230 is the image to be output to the display device 300. For this reason, a field angle of the image captured by the CMOS image sensor 230 is larger than a field angle of the image to be output to the display device 300.

The HDMI interface 260 is a communication interface for performing communication compliant with the HDMI (High-Definition Multimedia Interface) standards. The HDMI interface 260 can transmit various digital signals of images, sounds, and the like bidirectionally. The HDMI interface 260 is electrically connected to a HDMI of an other electronic device via the HDMI cable 110. That is to say, the remote camera 200 is electrically connected to an other electronic device (the display device 300 or the like) via the HDMI cable 110. As a result, the remote camera 200 can transmit various digital signals of images, sounds, and the like to an other electronic device or can receive various digital signals of control commands and the like from an other electronic device. Note that, instead of the HDMI interface 260, another connecting unit such as a wired LAN (Local Area Network) or a wireless LAN may be used.

The infrared ray receiver 270 is an interface for receiving an infrared signal from the infrared remote controller 400. The infrared signal received by the infrared ray receiver 270 is transmitted to the controller 210. The controller 210 performs various controls based on the received infrared signals. The infrared ray receiver 270 is not a component that is essential for the remote camera 200. However, the infrared ray receiver 270 enables the reception of the infrared signals transmitted from the infrared remote controller 400, and can provide a plurality of operating methods to a user.

1-1-1-1. Image Region in Picked-Up Region

Figure 5:
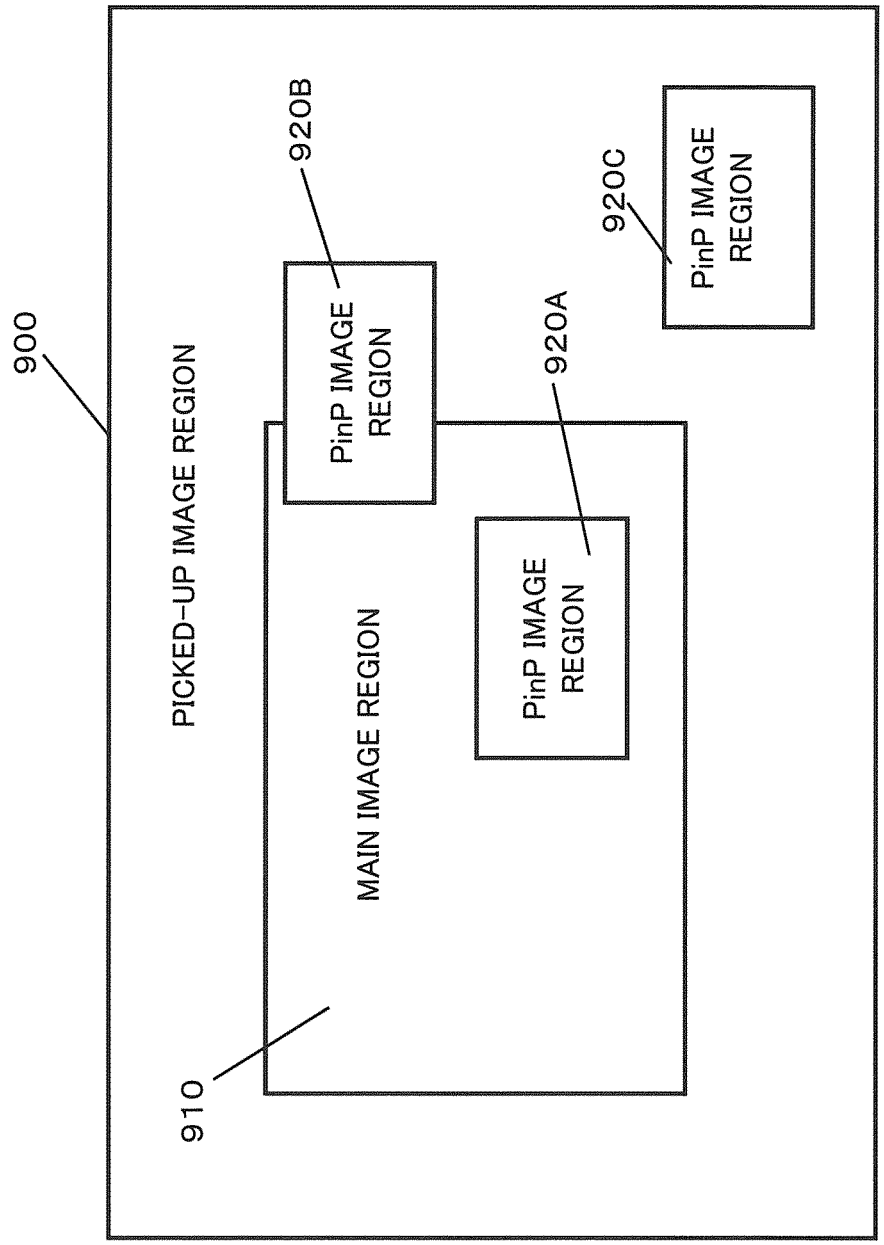
FIG. 5 is a diagram describing a picked-up image region, a main image region, and a PinP image region.

FIG. 5 is a diagram for describing the respective regions to be used for display in the entire image region captured by the CMOS image sensor 230. A picked-up image region 900 is an entire region of the image region obtained by imaging through the CMOS image sensor 230. A main image region 910 is a partial region of the picked-up image region 900, and is an image region to be adopted (displayed) as a main screen on the display device 300 when the main image 800, described later, is selected as a control target. PinP image regions 920A to 920C are examples of the image regions that are adopted (displayed) out of the picked-up image region 900 as the PinP image on the display device 300. FIG. 5 illustrates variations 920A to 920C of the image region that can be adopted as the PinP image regions. The PinP image region 920A is an example in a case where the PinP image region contained completely in the main image region 910 is set. The PinP image region 920B is an example in a case where the PinP image region is set to be partially overlapped with the main image region 910. The PinP image region 920C is an example in a case where an image region outside the main image region 910 is set as the PinP image region. In this manner, in the video teleconference system 100, a partial region of the picked-up image region 900 is cut out as the PinP image region to be displayed on the display device 300. That is to say, in the mode for setting the PinP image region, described later, both outside region and inside region of the main image region 910 can be adopted as the PinP image region in the picked-up image region 900 if each of the outside region and the inside region is within the region of the main image 800 that is shifted to a wide-angle end. As a result, suitable PinP images can be displayed according to applications of the video teleconference system 100.

1-1-2. Display Device

Figure 6:
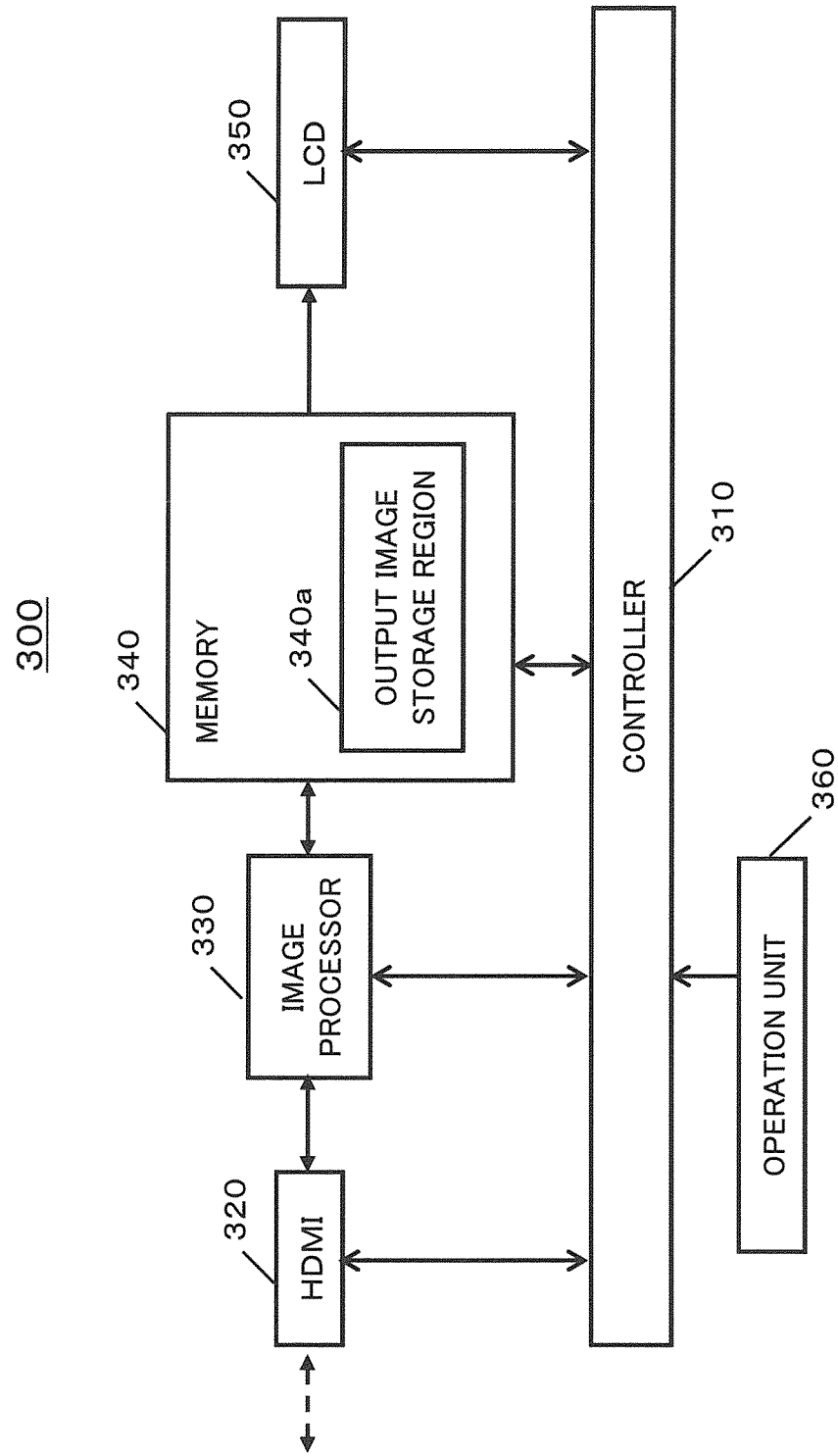
FIG. 6 is an electrical configuration diagram of a display device.

FIG. 6 is an electrical configuration diagram of the display device 300. The configuration of the display device 300 is described with reference to FIG. 6.

As shown in FIG. 6, the display device 300 includes a controller 310, an HDMI interface 320, an image processor 330, a memory 340, a liquid crystal display 350, and an operating section 360.

The controller 310 generally controls the entire operation of the display device 300. The controller 310 includes a ROM (not shown) for storing information such as programs, and a CPU (not shown) for processing the information such as programs. The ROM stores a program relating to display control, and programs for generally controlling the entire operation of the display device 300. The controller 310 transmits a control signal to the image processor 330, the liquid crystal display 350, and the like based on a vertical synchronizing signal (VD). The controller 310 may be implemented by a hard-wired electronic circuit, a microcomputer, or the like. Further, the controller 310 as well as the image processor 330 described later and the like may be implemented as one integrated circuit. The ROM does not have to be the internal component of the controller 310, and may be provided to the outside of the controller 310.

The HDMI interface 320 is a communication interface for performing communication compliant with the HDMI standards. The HDMI interface 320 can transmit various digital signals of images, sounds, and the like bidirectionally. The HDMI interface 320 is electrically connected to an HDMI of an other electronic device via the HDMI cable 110. That is to say, the display device 300 is electrically connected to an other electronic device (the remote camera 200 or the like) via the HDMI cable 110. As a result, the display device 300 can receive various digital signals of images, sounds, and the like from an other electronic device, and can transmit various digital signals of control commands and the like to an other electronic device. Note that, instead of the HDMI interface 320, an other connecting unit such as a wired LAN (Local Area Network) or a wireless LAN may be used.

The image processor 330 executes various image processes on image data obtained via the HDMI interface 320. Examples of the various processes are gamma correction, white balance correction, a YC converting process, an electronic zooming process, a compressing process, and an expanding process, but the various processes are not limited to them. The image processor 330 may be implemented by a hard-wired electronic circuit, a microcomputer for executing programs for executing these processes, or the like. Further, the image processor 330 as well as the controller 310 and the like may be implemented as one integrated circuit.

The memory 340 is a recording medium that functions as a work memory of the controller 310 and the image processor 330. The memory 340 can be implemented by a DRAM (Dynamic Random Access Memory) or the like. The memory 340 has an output image storage region 340a. The output image storage region 340a is a storage region for temporarily storing an image to be output to the liquid crystal display 350.

The liquid crystal display 350 displays an image processed by the image processor 330 and stored in the output image storage region 340a in the memory 340. Note that, instead of the liquid crystal display 350, an other display device such as an organic EL display or the like may be used.

The operation unit 360 is a general term for a keyboard, a mouse, and/or the like provided to the display device 300, and receives user's operations. When receiving user's operations, the operation unit 360 transmits various operation instructing signals to the controller 310.

1-1-3. Infrared Remote Controller

Figure 7:
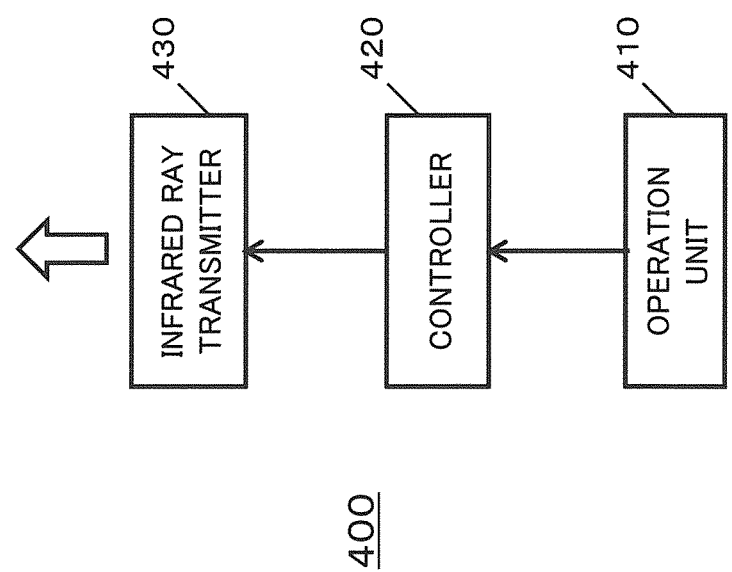
FIG. 7 is an electrical configuration diagram of an infrared remote controller.

FIG. 7 is an electrical configuration diagram of the infrared remote controller 400. A configuration of the infrared remote controller 400 is described with reference to FIG. 7.

As shown in FIG. 7, the infrared remote controller 400 includes an operation unit 410, a controller 420, and an infrared ray transmitter 430.

The operation unit 410 is a general term for a cross key, number keys, and/or the like provided to the infrared remote controller 400, and receives user's operations. When receiving user's operation, the operation unit 410 transmits various operation instructing signals to the controller 420.

The controller 420 generally controls an entire operation of the infrared remote controller 400. The controller 420 generates a control signal based on the operation instructing signals received by the operation unit 410. The controller 420 transmits the generated control signal to the infrared ray transmitter 430.

The infrared ray transmitter 430 is an interface for transmitting an infrared signal to the infrared ray receiver 270 of the remote camera 200. The infrared ray transmitter 430 transmits an infrared signal to the outside based on the control signal received from the controller 420.

Note that the infrared remote controller 400 is not a component that is essential for the video teleconference system 100. However, the infrared remote controller 400 copes with the infrared ray communication, and thus can provide a plurality of operating methods to the user.

1-1-3-1. Operation Screen of Remote Camera

Figure 8:
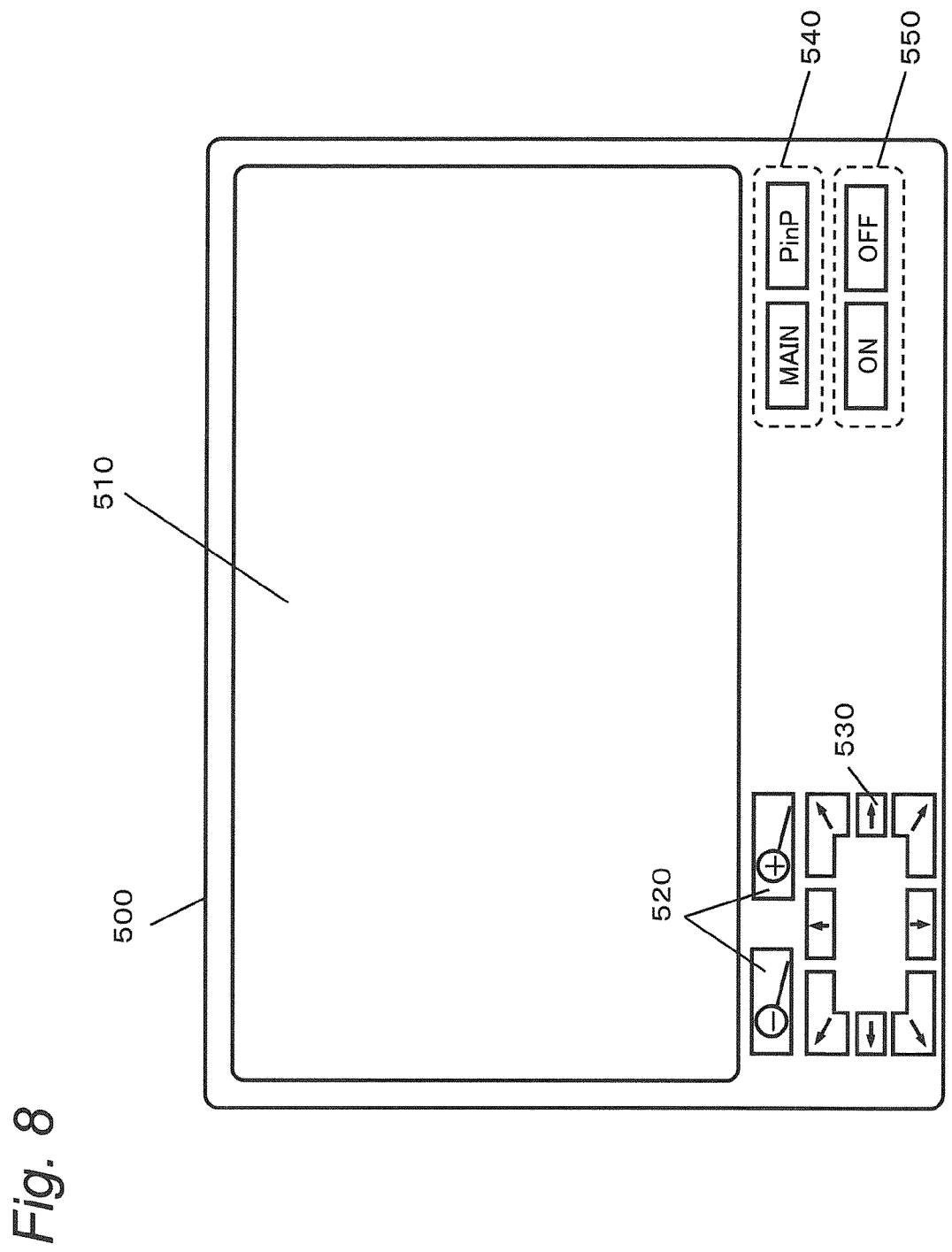
FIG. 8 is a diagram describing an operation screen for operating the remote camera.

FIG. 8 is a diagram illustrating one example of a screen for operating the remote camera 200. The screen for operating the remote camera 200 will be described with reference to FIG. 8.

A display screen 500 shown in FIG. 8 is generated by the remote camera 200, and is transmitted to the display device 300 via the HDMI cable 110 to be displayed on the liquid crystal display 350 of the display device 300. Note that the display screen shown in FIG. 8 may be generated not on the side of the remote camera 200 but on the side of the display device 300. The display screen 500 includes a camera image display region 510, a zoom instruction buttons 520, a direction instruction buttons 530, a control target selection buttons 540, and a PinP display selection buttons 550. The various buttons 520, 530, . . . of the display screen 500 are operated by the operation unit 360 of the display device 300.

Note that, in the display screen 500, the zoom instruction buttons 520, the direction instruction buttons 530, the control target selection buttons 540, and the PinP display selection buttons 550 are not essential components. When the remote camera 200 is operated by an other operation unit such as the infrared remote controller 400, these components do not have to be provided.

The respective components of the display screen 500 will be described. The camera image display region 510 is a region in which a real time image output from the remote camera 200 is displayed.

The zoom instruction buttons 520 includes a zoom instruction button for a telephoto direction (image enlarging direction) and a zoom instruction button for a wide-angle direction (image reducing direction). The user operates the operation unit 360 of the display device 300 to presses down any one button of the zoom instruction buttons 520, thereby instructing the remote camera 200 to perform the zooming in the telephoto direction or the wide-angle direction. When receiving the zooming instruction by the operation of the operation unit 360, the controller 310 instructs the remote camera 200 to perform the zooming via the HDMI interface 320 and the HDMI cable 110. The controller 210 of the remote camera 200 performs zooming control according to the zooming instruction form the display device 300. Then, the remote camera 200 transmits an image on which the content of the zooming instruction are reflected, to the display device 300 via the HDMI interface 260 and the HDMI cable 110. As a result, an image in which the zooming instruction content is reflected is displayed on the camera image display region 510.

The direction instructions button 530 includes change instruction buttons for up, down, right and left directions. The user operates the operation unit 360 to press down the button for any direction in the direction instruction buttons 530, thereby can change a position of a subject to be photographed by the remote camera 200.

The control target selection buttons 540 is buttons for setting the main screen or the PinP screen as a target to be controlled by the zoom instruction buttons 520 and the direction instruction buttons 530. The user operates the operation unit 360 of the display device 300 to press down any one of a main screen button and a PinP screen button in the control target selection buttons 540. As a result, the main image or the PinP image, to which the instruction for the remote camera 200 based on the zoom instruction button 520 or the direction instruction button 530 is applied, can be selected.

The PinP display selection buttons 550 is buttons for switching PinP display between ON and OFF. When the user operates the operation unit 360 to select "ON" for the PinP display, a synthesized image obtained by superimposing the PinP image on an upper right of the main screen is output from the remote camera 200 to the display device 300. As a result, the synthesized image (PinP image) output from the remote camera 200 is displayed on the camera image display region 510 of the display screen 500. When "OFF" for the PinP display is selected, the PinP image is not superimposed, and only the main screen is output from the remote camera 200 to the display device 300. As a result, only the main screen is displayed on the camera image display region 510.

1-2. Operation

The operations of the video teleconference system 100 according to the first embodiment will be sequentially described.

1-2-1. Operation at Time of Operating the PinP Display Selection Button

Figure 9:
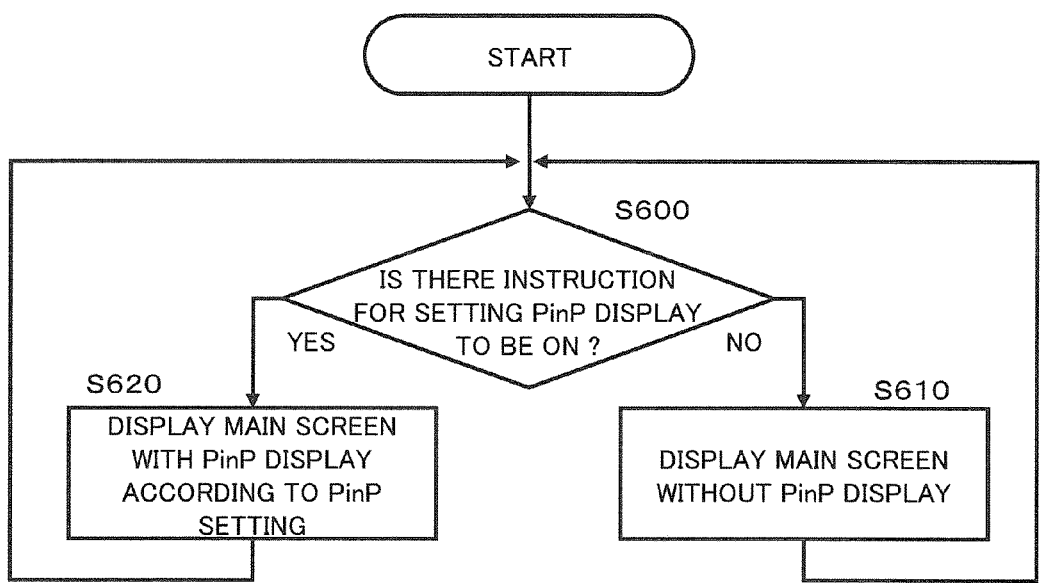
FIG. 9 is a flowchart illustrating an operation of the display device at a time when a PinP display selection button is operated.

FIG. 9 is a flowchart illustrating an operation at a time when the PinP display selection buttons 550 are operated on the display screen 500 shown in FIG. 8. The operation at the time when the PinP display selection buttons 550 are operated will be described with reference to FIG. 9.

The controller 310 of the display device 300 monitors the operation (ON/OFF) on the PinP display selection buttons 550 by the user (S600). When the user operates the PinP display selection buttons 550 to press down the button for instructing "OFF" for PinP image (NO at step S600), the controller 310 of the display device 300 transmits an instruction for outputting only the main image without outputting of the PinP image (the instruction for PinP display OFF) to the remote camera 200 via the HDMI interface 320. Note that the instruction for ON/OFF of the PinP display may be issued to the remote camera 200 from the display device 300 via the HDMI interfaces 320 and 260, or may be issued by using the infrared remote controller 400 via the infrared ray receiver 270 attached to the inside of the remote camera 200.

When receiving the instruction to switch OFF the PinP display, the controller 210 of the remote camera 200 writes only data of the main image in the output image storage region 250b of the memory 250, and then outputs the data of the main image written into the output image storage region 250b to the display device 300 via the HDMI interface 260.

The controller 310 of the display device 300 displays an image indicated by the image data input from the remote camera 200 via the HDMI interface 320 (the main screen without the PinP image) on the camera image display region 510 of the liquid crystal display 350 (S610).

On the other hand, when the button instructing "ON" of PinP image in the PinP display selection button 550 is pressed down (YES at step S600), the controller 310 of the display device 300 transmits an instruction for outputting a synthesized image obtained by superimposing the PinP image on the main image (the instruction for switching ON the PinP display) to the remote camera 200 via the HDMI interface 320. When receiving the instruction for switching ON the PinP display, the controller 210 of the remote camera 200 writes the main image in the output image storage region 250b of the memory 250 and then superimposes the PinP image on the upper right of the main image to generate the synthesized image. Thereafter, the controller 210 outputs the synthesized image written into the output image storage region 250b to the display device 300 via the HDMI interface 260.

The controller 310 of the display device 300 displays the synthesized image input from the remote camera 200 via the HDMI interface 320 on the camera image display region 510 of the liquid crystal display 350 (S620).

Note that a position at which the PinP image is superimposed on the main image is not limited to the upper right position, and any position such as upper right, upper left, lower left, lower right positions, and so on of the screen may be selected by setting through a user's operation.

1-2-2. Operation at Time of Operating the Control Target Selection Buttons

Figure 10:
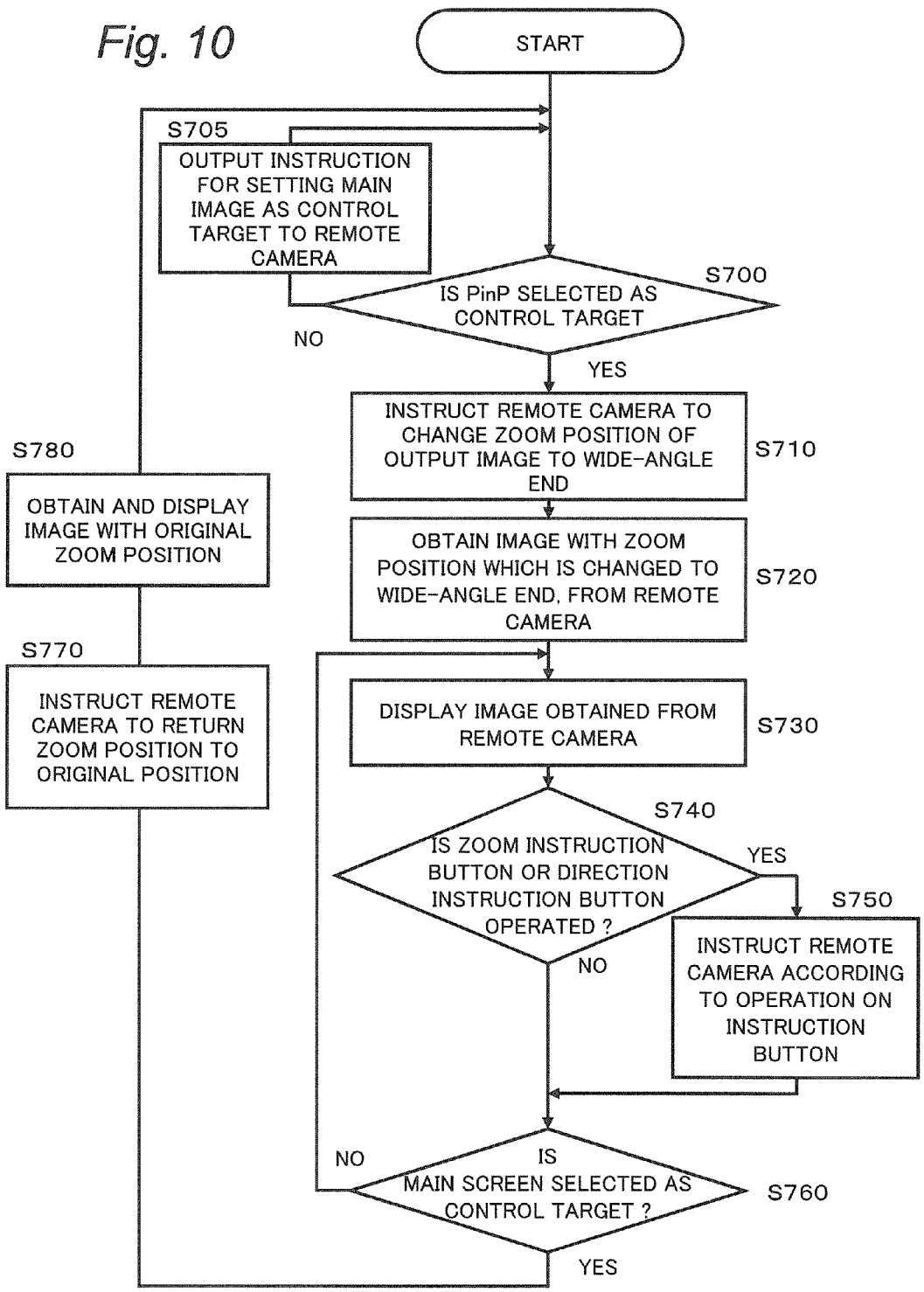
FIG. 10 is a flowchart illustrating an operation of the display device at a time when a control target selection button is operated.

FIG. 10 is a flowchart illustrating an operation of the display device 300 at a time when the control target selection buttons 540 are operated. The operation of the display device 300 at the time when the control target selection buttons 540 are operated is described with reference to FIG. 10.

The controller 310 of the display device 300 monitors whether the main image button or the PinP image button is selected in the control target selection buttons 540. A process illustrated in the flowchart of FIG. 10 is executed when any one of the main image button and the PinP image button is selected in the control target selection buttons 540.

When the user presses down the main image button in the control target selection buttons 540 (NO at step S700), the controller 310 of the display device 300 transmits an instruction for setting the main image as a control target to the remote camera 200 via the HDMI interface 320 (S705). The controller 210 of the remote camera 200 receives the instruction for setting the main image as the control target. When being notified of the operation instruction content of the zoom instruction buttons 520 from the display device 300 in this state, the controller 210 of the remote camera 200 instructs the image processor 240 to execute the zooming process only on the main image based on the operation instruction content.

Note that the zooming process in the remote camera 200 is not limited to an electronic zooming process to be executed by the image processor 240, and an optical zooming process may be executed by the lens 220.

The image processor 240 of the remote camera 200 executes the process on the main image and the PinP image alternately based on the vertical synchronizing signal (VD). That is to say, at the timing at which the main image is being processed, the digital zooming process is executed, the image subjected to the digital zooming process is written into the memory 250 and is output via the HDMI interface 260. When the direction instruction buttons 530 are operated, the controller 210 instructs the image processor 240 to change the position of the subject represented by the main image.

The image processor 240 changes the position of an image region to be adopted as the main image in a picked-up image (an image written into the picked-up image storage region 250a of the memory 250) output from the CMOS image sensor 230 according to the operation of the direction instruction buttons 530 at a timing at which an image process is executed on the main image. The image processor 240 writes the image data in the changed image region into the output image storage region 250b of the memory 250 to output the image data via the HDMI interface 260. The controller 310 of the display device 300 displays the image indicated by the image data input from the remote camera 200 via the HDMI interface 320 on the camera image display region 510.

Next, a case in which the user selects the PinP image as the control target will be described. In the flowchart of FIG. 10, when the user presses down the PinP image button in the control target selection buttons 540 (YES at step S700), the controller 310 of the display device 300 instructs the remote camera 200 via the HDMI interface 320 to make a range of the image represented by the main image wider (S710). That is to say, the controller 310 instructs the remote camera 200 to change a zoom position of the main image to the wide-angle end (S710).

When the PinP image is the control target, the user operates the zoom instruction buttons 520 or the direction instruction buttons 530 to be capable of setting any image region in the entire region of the picked-up image as the PinP image. The controller 210 widens the range of the image represented by the main image (namely, change the zoom position to the wide-angle ends) when the PinP image becomes the control target, thereby the user easily understands a present or future setting position of the PinP image. That is to say, the main image is changed into an image of the widest angle, so that the user easily understands a relative positional relationship of the PinP image in the entire picked-up image region. Therefore, the user easily understands the position of the PinP image region in the picked-up image region that is currently set. Further, the user easily understands a position in the picked-up image region to which the PinP image may be set.

In the present embodiment, the zoom position is changed to the wide-angle end for further understanding of the user at the time of operating the setting position of the PinP image. However, the zoom position does not have to be changed to the wide-angle end. The zoom position may be shifted to cause a field angle of the PinP image to be a field angle on the side of the wider-angle end than the field angle of the main image displayed just before the PinP image is set as the control target. Even such a method makes the user easily understand the relative positional relationship of the PinP image in the entire picked-up image region.

When receiving the instruction for changing the zoom position of the main image to the wide-angle end, the controller 210 of the remote camera 200 instructs the image processor 240 to zoom the main image to the wide-angle end. At a timing where the image process is executed on the main image, the image processor 240 executes the zooming process to move the zoom position to the wide-angle end, writes picked-up image data into the memory 250, and outputs the image data via the HDMI interface 260. The display device 300 obtains the synthesized image including the main image with zoom position changed to the wide-angle end, from the remote camera 200 via the HDMI interface 320 (S720).

Then, the controller 310 of the display device 300 displays the synthesized image obtained from the remote camera 200 via the HDMI interface 320 on the camera image display region 510 of the liquid crystal display 350 (S730). As a result, the synthesized image by which the user easily understands the region and the position of the PinP image (namely, the PinP image is easily controlled) is displayed on the display device 300.

In this state, the controller 310 of the display device 300 monitors whether the zoom instruction buttons 520 and the direction instruction buttons 530 are operated (S740). When the zoom instruction buttons 520 or the direction instruction buttons 530 are operated (YES at step S740), the controller 310 issues an instruction to the remote camera 200 according to the operation content (S750).

For example, when the zoom instruction buttons 520 are operated, the controller 310 instructs the image processor 240 of the remote camera 200 to execute the zooming process not on the main image but only on the PinP image. The image processor 240 executes the digital zooming process on PinP image for only a period for which the image process is executed on the PinP image. Then, the image processor 240 writes the synthesized image including the PinP image that has undergone the digital zooming process into the output image storage region 250b of the memory 250. Thereafter, the synthesized image is output via the HDMI interface 260.

Similarly in the case where the direction instruction buttons 530 are operated, the controller 310 instructs the image processor 240 of the remote camera 200 about a new reading position of the PinP image in the image region of the picked-up image. The image processor 240 changes the reading position of the PinP image in the picked-up image region based on the vertical synchronizing signal for a period where the image process is executed on the PinP image. The image data on the changed read position is written into the memory 250 to be output via the HDMI interface 260.

The controller 310 of the display device 300 displays an image indicated by the image data received from the remote camera 200 via the HDMI interface 320, on the camera image display region 510.

In this state, the controller 310 of the display device 300 monitors whether the main image is selected as the control target (S760). The controller 310 of the display device 300 repeats the operations at step S730 to step S760 until the main image is again selected as the control target, namely, while the PinP image is selected as the control target.

Thereafter, when the main image is selected as the control target (YES at step S760), the controller 310 of the display device 300 instructs the remote camera 200 to return the main image again to a field angle before step S700 (S770). Then, the controller 310 of the display device 300 receives the image data including a main image of the previous field angle (the main image photographed at the previous zoom position) from the remote camera 200, and displays an image indicated by the received image data on the camera image display region 510 (S780). In this manner, the setting of an image region in the image region represented by the picked-up image as the PinP image is completed.

FIGS. 11A to 11E are diagrams describing screen transition at a time when the control target selection buttons 504 are operated. The screen transition at the time when the control target selection buttons 540 are operated is described below with reference to FIGS. 11A to 11E.

Figure 11:
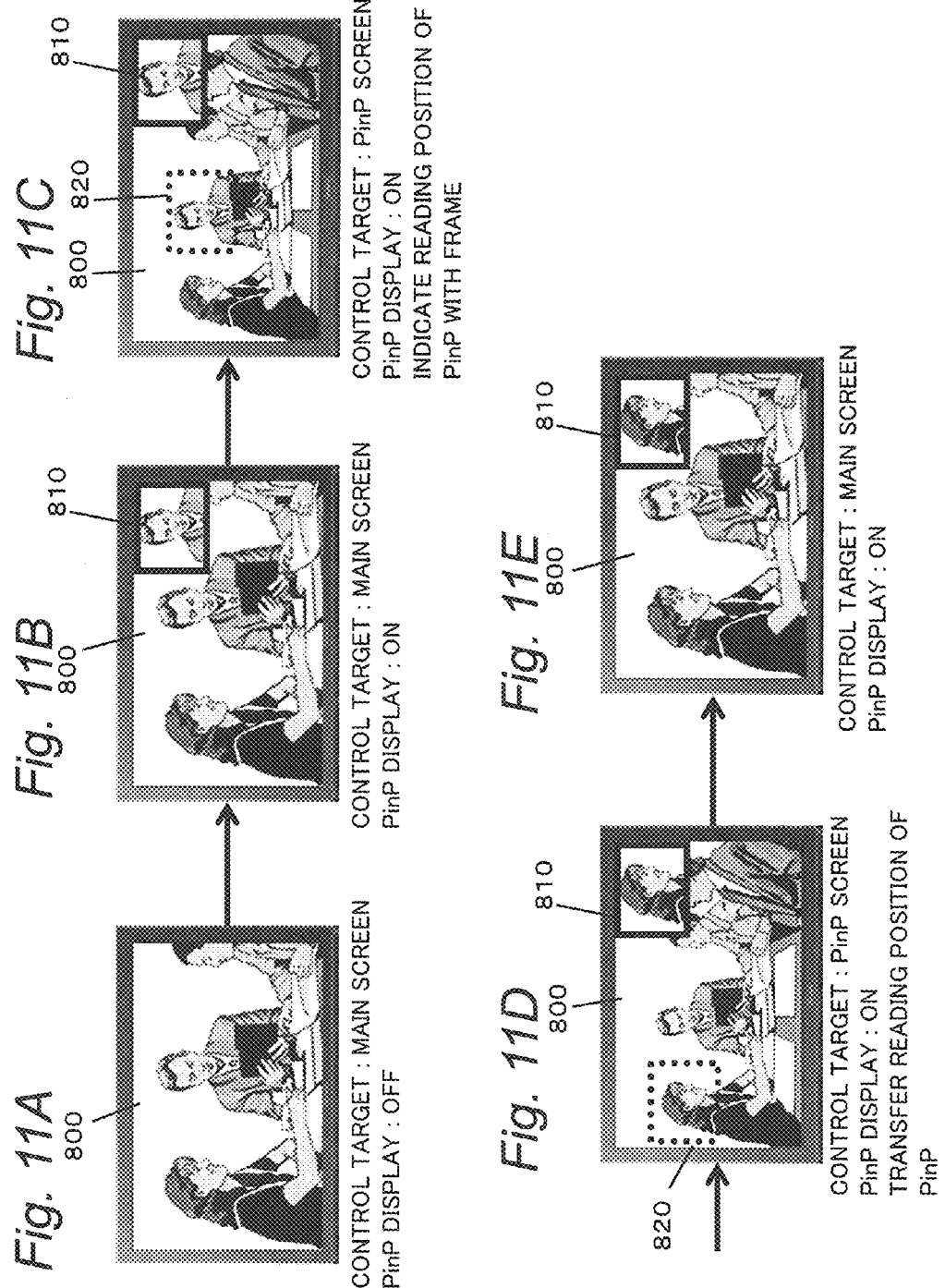
FIGS. 11A to 11E are diagrams describing screen transition at the time when the control target selection button is operated.

FIG. 11A is a diagram illustrating an example of the screen displayed on the camera image display region 510 while a main image 800 is being selected as the control target and display of the PinP image 810 is being selected to be OFF. At this time, since the display of the PinP image 810 is selected to be OFF, the PinP image 810 is not displayed on the camera image display region 510. Further, since the main image 800 is selected as the control target, the user operates the zoom instruction buttons 520 or the direction instruction buttons 530 to be capable of setting an image region in the entire image region of the picked-up image as the main image.

FIG. 11B illustrates the screen that is changed from the screen in FIG. 11A. FIG. 11B is a diagram illustrating a screen example when the main image 800 remains selected as the control target and the display of the PinP image 810 is selected to be ON. At this time, since the display of the PinP image 810 is selected to be ON, the camera image display region 510 displays a synthesized image obtained by superimposing the PinP image 810 on the main image 800.

FIG. 11C illustrates the screen that is changed from the screen in FIG. 11B. FIG. 11C is a diagram illustrating a screen example when the display of the PinP image 810 remains selected to be ON and the PinP image 810 is selected as the control target. At this time, in association with the selection of the PinP image 810 as the control target, a broken line frame 820 is superimposed to be displayed on the main image 800. The broken line frame 820 indicates a region in the image region of the main image 800 that is read as the PinP image 810. This broken line frame 820 enables the user to understand an image region in the image region represented by the main image 800 that is set as the PinP image 810. Further, in association with the selection of the PinP image 810 as the control target, the field angle (zoom position) of the image region represented by the main image 800 shifts to the wide-angle end. As a result, the user easily understands a position of the image region in the picked-up image currently set as the PinP image, and an image region in the picked-up image to which the setting position as the PinP image is changed. In a state where the screen of FIG. 11C is displayed, the user can set a region of the PinP image in the region of the main image of a wider field angle.

FIG. 11D illustrates the screen that is changed from the screen in FIG. 11C. In FIG. 11D, the display of the PinP image 810 remains selected to be ON and the PinP image 810 remains selected as the control target. In FIG. 11D, the broken line frame 820 indicating the setting position of the PinP image is transferred from the position shown in FIG. 11C by the operation of the direction instruction buttons 530. At this time, in association with the transfer of the position of the broken line frame 820 indicating the setting position of the PinP image, the display content of the PinP image 810 changes. As a result, the user easily understands how the display content of the PinP image 810 changes while transferring the setting position of the PinP image. Further, at this time, since the PinP image 810 remains selected as the control target, the field angle (zoom position) of the image region represented by the main image 800 is maintained at the wide-angle end. As a result, the user can transfer the PinP reading position while understanding the image region in the picked-up image to which the setting position as the PinP image may be changed.

FIG. 11E illustrates the screen that is changed from the screen shown in FIG. 11D. FIG. 11E is a diagram illustrating the screen when the display of the PinP image 810 remains selected to be ON, but the control target is changed from the PinP image 810 into the main image 800. In association with the change of the control target from the PinP image 810 into the main image 800, the frame 820 indicating the setting position of the PinP image is not displayed. Further, in association with the change of the control target from the PinP image 810 into the main image 800, the operation for setting the setting position of the PinP image is regarded as completed, and the field angle (zoom position) of the image region represented by the main image 800 is returned to the field angle (zoom position) just before the PinP image 810 is selected as the control target. With the above method, a intended image region can be set as the PinP image in the image region represented by the picked-up image.

1-2-3. Operation at Time of Switching Aspect Ratio

Figure 12:
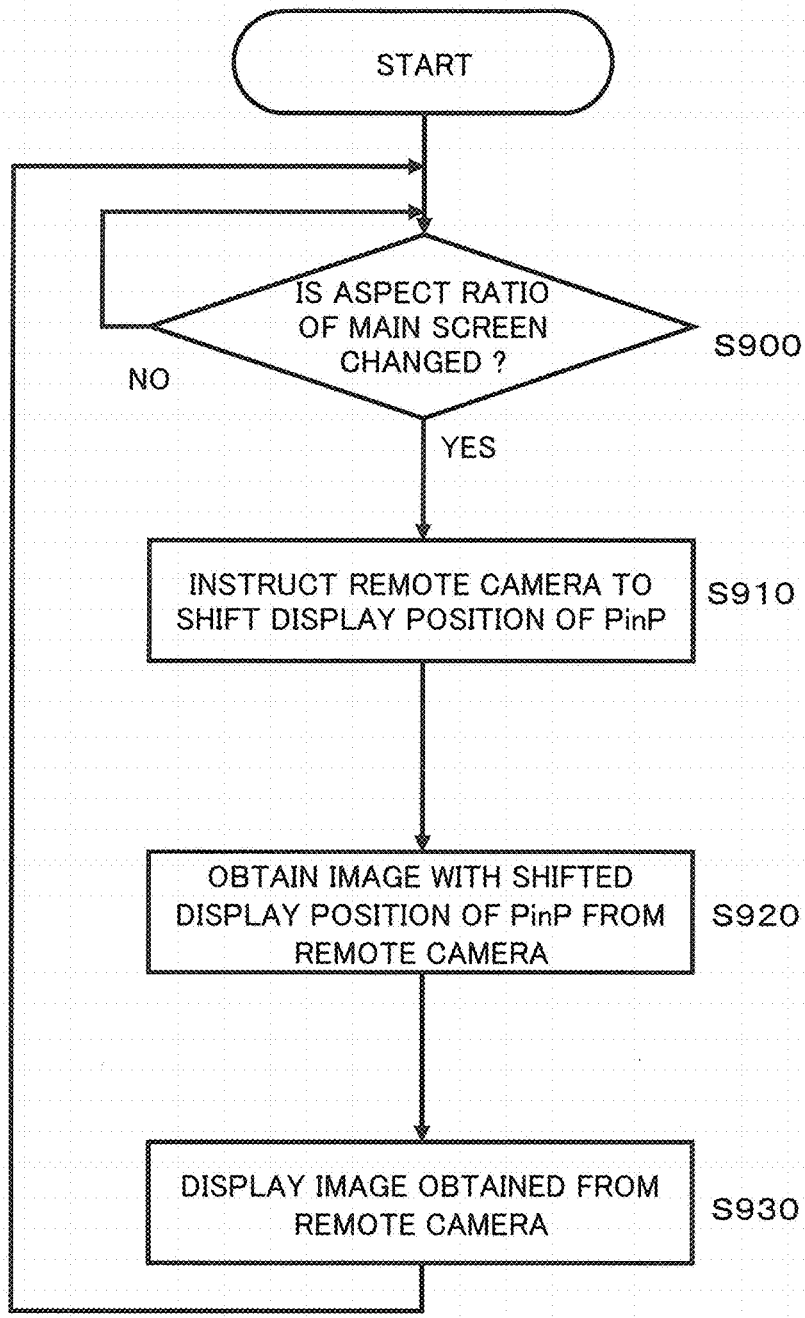
FIG. 12 is a flowchart illustrating an operation of the display device at a time when an output aspect ratio during HDMI output is switched.

FIG. 12 is a flowchart illustrating operations for switching an aspect ratio in image output via the HDMI interface. The operations for switching the aspect ratio of the image in HDMI output will be described with reference to FIG. 12.

The controller 210 of the remote camera 200 monitors whether the aspect ratio of the main screen is changed (S900). The user can switch the aspect ratio of the output image in the HDMI output through menu operations of the remote camera 200. When the aspect ratio of the remote camera 200 is changed (YES at step S900), the controller 210 of the remote camera 200 instructs the image processor 240 of the remote camera 200 to shift the superimposing position for the PinP image (S910).

Herein, a case in which the output aspect is changed into 4:3 sidecut while the output aspect is set to 16:9 and the PinP image is displayed on the upper right end of the image region represented by the main image will be described. At this time, the position at which the PinP image is superimposed is transferred to the inner side in the image region represented by the main image. Specifically, the image processor 240 transfers the position of PinP image to the inner side by at least a width of the sidecut in order to avoid a state that the PinP image superimposed on the main image is not displayed due to 4:3 sidecut. The image processor 240 executes this process at the timing at which the image process is executed on the PinP image. When the PinP image is superimposed on the main image to be written into the output image storage region 250b of the memory 250, the image processor 240 shifts the writing position of the PinP image. Specifically, the writing position of the PinP image is shifted to the center side of the screen by the width for eliminating a portion that is not displayed due to the sidecut to write the PinP image. The controller 210 of the remote camera 200 reads a synthesized image obtained by the main image and the PinP image shifted to the inner side of the screen and written from the output image storage region 250b of the memory 250, and provides a side black to the right and left of the screen to output the synthesized image via the HDMI interface 260.

The controller 310 of the display device 300 obtains the synthesized image provided with the side blacks on the right and left of the screen from the remote camera 200 via the HDMI interface 320 (S920).

Then, the controller 310 displays the synthesized image obtained from the remote camera 200 on the camera image display region 510 of the liquid crystal display 350 (S930).

As described above, when the output aspect ratio is switched, the display position of the PinP image is shifted. Note that, when the aspect ratio is changed from 4:3 into 16:9, the display position of the PinP image may be shifted to the outside.

FIGS. 13A and 13B are diagrams describing screen transition at a time when the aspect ratio of the output image is switched. FIG. 13A is a diagram illustrating an example of the screen when the output aspect is set to 16:9. On the other hand, FIG. 13B is a diagram illustrating an example of the screen when the output aspect in the state of FIG. 13A is changed into 4:3 sidecut. As shown in FIG. 13B, when the output aspect is changed into 4:3 sidecut, the position of the PinP image is transferred so that the image region of the PinP image to be superimposed on the main image is not overlapped with the sidecut. As a result, the state that the PinP image is not displayed due to sidecut can be avoided.

The above example describes the case in which the aspect ratio is changed into 4:3 sidecut, but the change in the aspect ratio is not limited to sidecut but top/bottom cut may be used. In this case, in association with the setting change of the aspect ratio, the position of the PinP image is transferred so that the region of the PinP image to be superimposed on the main image is not overlapped with the top/bottom cut.

In the above example, the operation for switching the aspect ratio is performed on the side of the remote camera 200, but the display device 300 may instruct the switching of the aspect ratio.

1-3. Effects or the Like

As described above, the display device 300 is a display control device for controlling a video image to be displayed on the liquid crystal display 350. The display device 300 has the controller 310 for generating an image including the main image and the PinP image superimposed on the main image to display the image on the liquid crystal display 350. When a mode for setting the main screen as the control target (first mode) is set, the controller 310 performs control to display the main image of a predetermined field angle (first field angle) on the liquid crystal display 350. Note that, in the first mode, the PinP image is superimposed and displayed on the main image, but the control target is the main screen. On the other hand, when a mode for setting the PinP screen as the control target, namely, a mode for setting a region of PinP image in the region of the main image (second mode) is set, the controller 310 performs control to display the main image of a wider field angle on the liquid crystal display 350. As a result, the user easily understands a present set position of the PinP image and a position of the PinP image to be set later in a region of the picked-up image.

Further, the controller 310 sets an image region narrower than the image region represented by the picked-up image as the main image, and sets a predetermined region in the image region represented by the picked-up image as the PinP image. Then, the controller 310 performs control to display a synthesized image obtained by superimposing the set PinP image on the set main image on the liquid crystal display 350. As a result, the image region outside the image region represented by the main image displayed on the liquid crystal display 350 can be set as the PinP image.

Further, the display device 300 obtains the main image and the PinP image, and may determine a position in the obtained main image at which the obtained PinP image is superimposed on the main image according to the aspect ratio of the image region to be a display region on the liquid crystal display 350. The synthesized image obtained by superimposing the PinP image on the main image may be displayed on the liquid crystal display 350 based on the determined position. As a result, the state that the writing position for the PinP image is not displayed due to the setting change in the aspect ratio of the output image can be avoided.

Other Embodiments

As described above, as the illustration of the arts disclosed in the present application, the first embodiment is described. However, the arts in the present disclosure are not limited to this, and can be applied also to embodiments in which modifications, replacements, additions, and omissions are suitably carried out. Further, the respective components described in the first embodiment may be combined so that a new embodiment can be provided. Therefore, other embodiments will be illustrated below.

The above embodiment described the example in which one PinP image is superimposed on the main image, but the number of PinP images is not limited to one. A plurality of PinP images may be superimposed on the main image to be displayed.

In the above embodiment, the technical idea of the PinP function is applied to the video teleconference system including the remote camera 200 and the display device 300, but an application target is not limited to the video teleconference system. The technical idea in the above embodiment can be applied to electronic devices having the PinP function. For example, the technical idea can be applied to a combination of a monitoring camera and a device for controlling the monitoring camera.

In the above embodiment, the display device 300 contains a display device such as the liquid crystal display 350, but does not necessarily have to have such a display device. The display device 300 may output a video signal to a display device connected externally. That is to say, the display device 300 may be any device that can control an image displayed on a display device that is provided inside or externally connected.

The main image is one example of a first image. The PinP image is one example of a second image. The controller 310 is one example of a controller. The HDMI interface 320 is one example of a communication unit. The liquid crystal display 350 is one example of a display unit. The display device 300 is one example of a display control device.

As described above, as the illustration of the arts in this disclosure, the embodiments is described above. For this purpose, the accompanying drawings and the detailed description are provided for the illustration of the arts.

Therefore, the components described in the accompanying drawings and the detailed description may include not only the components essential for solving the problem but also components that are not essential for solving the problem in order to illustrate the arts. For this reason, even if these unessential components are described in the accompanying drawings and the detailed description, these unessential components should not be immediately approved as essential.

Further, since the above embodiments illustrates the arts in the present disclosure, various modifications, replacements, additions, and omissions can be carried out within the scope of claims or an equivalent scope.

INDUSTRIAL APPLICABILITY

The idea of the present disclosure can be applied to a display control device and a display control system that control the PinP display function.

The invention claimed is:

1. A display control device for controlling a video image displayed on a display unit, comprising:
    a control circuit configured to generate an image including a first image and a second image superimposed on the first image to display the image on the display unit, the second image at least partially outside or completely outside a field angle of the first image; and
    a memory including a storage region for storing the image to be displayed on the display unit, wherein
    the control circuit
        performs control to display the first image of a first field angle on the display unit when a first mode is set, and
        performs control to display the first image of a second field angle on the display unit when a second mode is set,
    the second mode is a mode for setting a region of the second image in a region of the first image of the second field angle; and
    the second image is selected such that the second image is at least partially outside or completely outside the first field angle of the first image.

2. The display control device according to claim 1, wherein in the first mode, the control circuit displays an image obtained by synthesizing the second image set in the second mode with the first image displayed at the first field angle, on the display unit.

3. The display control device according to claim 1, further comprising:
    a communication unit configured to transmit/receive digital signals to/from an imaging device so as to communicate with the imaging device, wherein
    the first image is an image that is captured by the imaging device and is received from the imaging device via the communication unit,
    when the first mode is switched into the second mode, the control circuit transmits an instruction for capturing an image at the second field angle to the imaging device via the communication unit.

4. The display control device according to claim 3, wherein the control circuit receives the first image captured at the second field angle from the imaging device via the communication unit.

5. The display control device according to claim 1, wherein the first image and the second image are images obtained by cutting out part of an entire region of an image captured by an imaging device.

6. The display control device according to claim 1, wherein the second field angle is wider than the first field angle.

* * * * *